(12) United States Patent
Newland

(10) Patent No.: US 6,600,549 B1
(45) Date of Patent: Jul. 29, 2003

(54) IMAGE SCANNING APPARATUS

(75) Inventor: Paul Johann Newland, Market Harborough (GB)

(73) Assignee: Fujifilm Electronic Imaging Ltd., Hertz (GB)

( * ) Notice: Subject to any disclaimer, the term of this patent is extended or adjusted under 35 U.S.C. 154(b) by 0 days.

(21) Appl. No.: 09/401,072

(22) Filed: Sep. 22, 1999

(30) Foreign Application Priority Data

Sep. 22, 1998 (EP) .............................. 98307684

(51) Int. Cl.⁷ ........................... G03B 27/58; G03B 27/62
(52) U.S. Cl. ............................................ 355/47; 355/72
(58) Field of Search .............................. 355/40, 41, 72, 355/75, 73, 47; 226/180; 347/262, 153; 271/271, 3.14, 4.01, 5, 84

(56) References Cited

U.S. PATENT DOCUMENTS

| 3,561,659 A | * | 2/1971 | Anthony ..................... 226/180 |
| 4,139,243 A | | 2/1979 | Landsman |
| 5,576,754 A | * | 11/1996 | Korem ........................ 347/262 |
| 5,828,399 A | * | 10/1998 | Van Aken et al. ........... 347/153 |
| 5,938,187 A | * | 8/1999 | Conlan et al. ............. 271/3.14 |
| 6,097,475 A | * | 8/2000 | Jakul et al. ..................... 355/72 |

FOREIGN PATENT DOCUMENTS

| EP | 0 096 530 A2 | 12/1983 |
| EP | 0 126 469 A2 | 11/1984 |
| EP | 0 551 772 A2 | 7/1993 |
| EP | 0 722 245 A | 7/1996 |
| EP | 0 734 856 A2 | 10/1996 |
| EP | 0 818 307 A1 | 1/1998 |

\* cited by examiner

*Primary Examiner*—D. Rutledge
(74) *Attorney, Agent, or Firm*—Sughrue Mion, PLLC

(57) ABSTRACT

Image scanning apparatus comprising a profiling surface; a feed mechanism for feeding a flexible radiation sensitive record medium across the profiling surface; a scanning system for scanning a modulated radiation beam across the record medium to expose the record medium; and a pressurizer operable simultaneously with the feed mechanism to apply a pressure difference across the record medium as it is fed across the profiling surface whereby the record medium engages the profiling surface and conforms with the shape of the profiling surface.

13 Claims, 4 Drawing Sheets

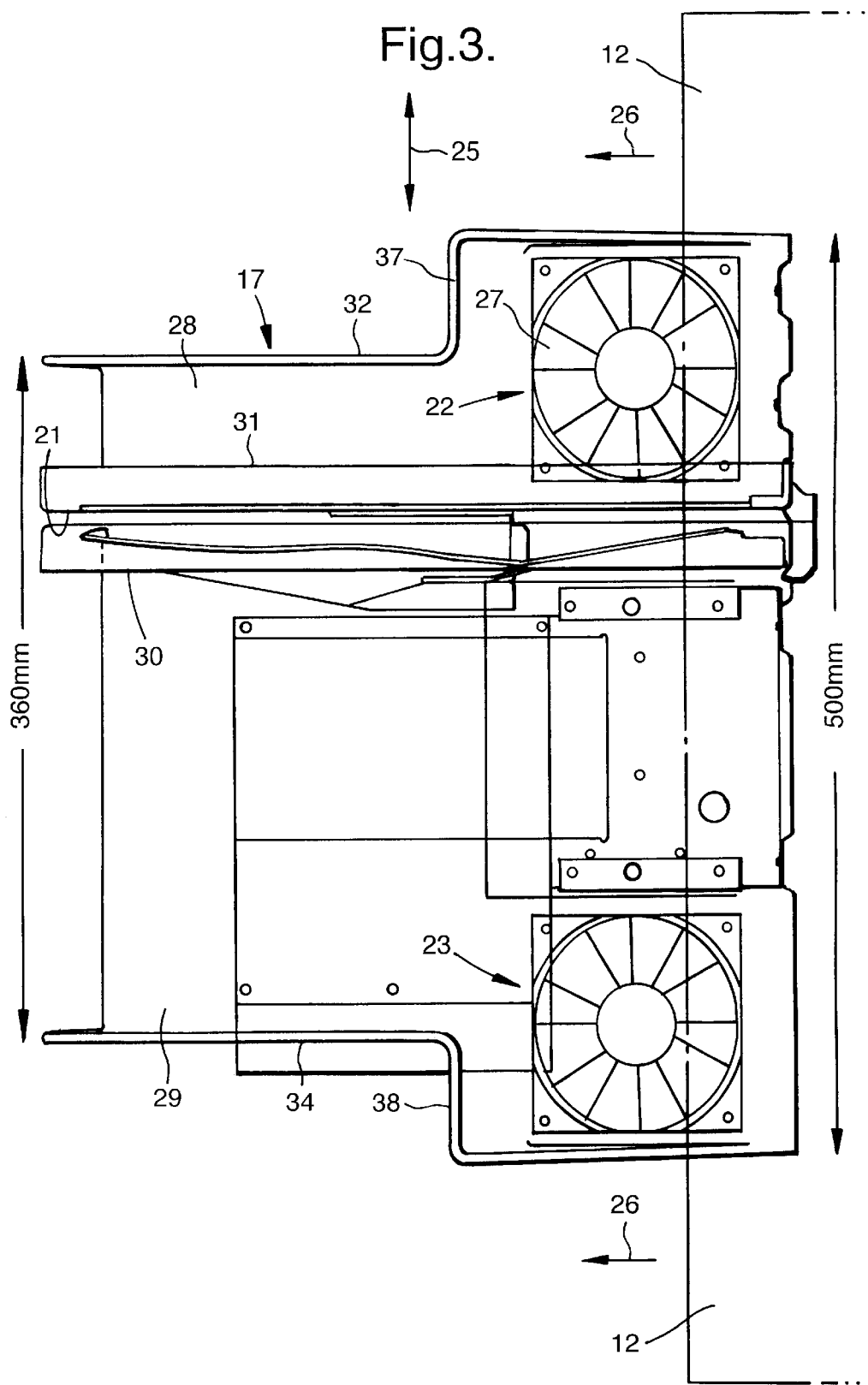

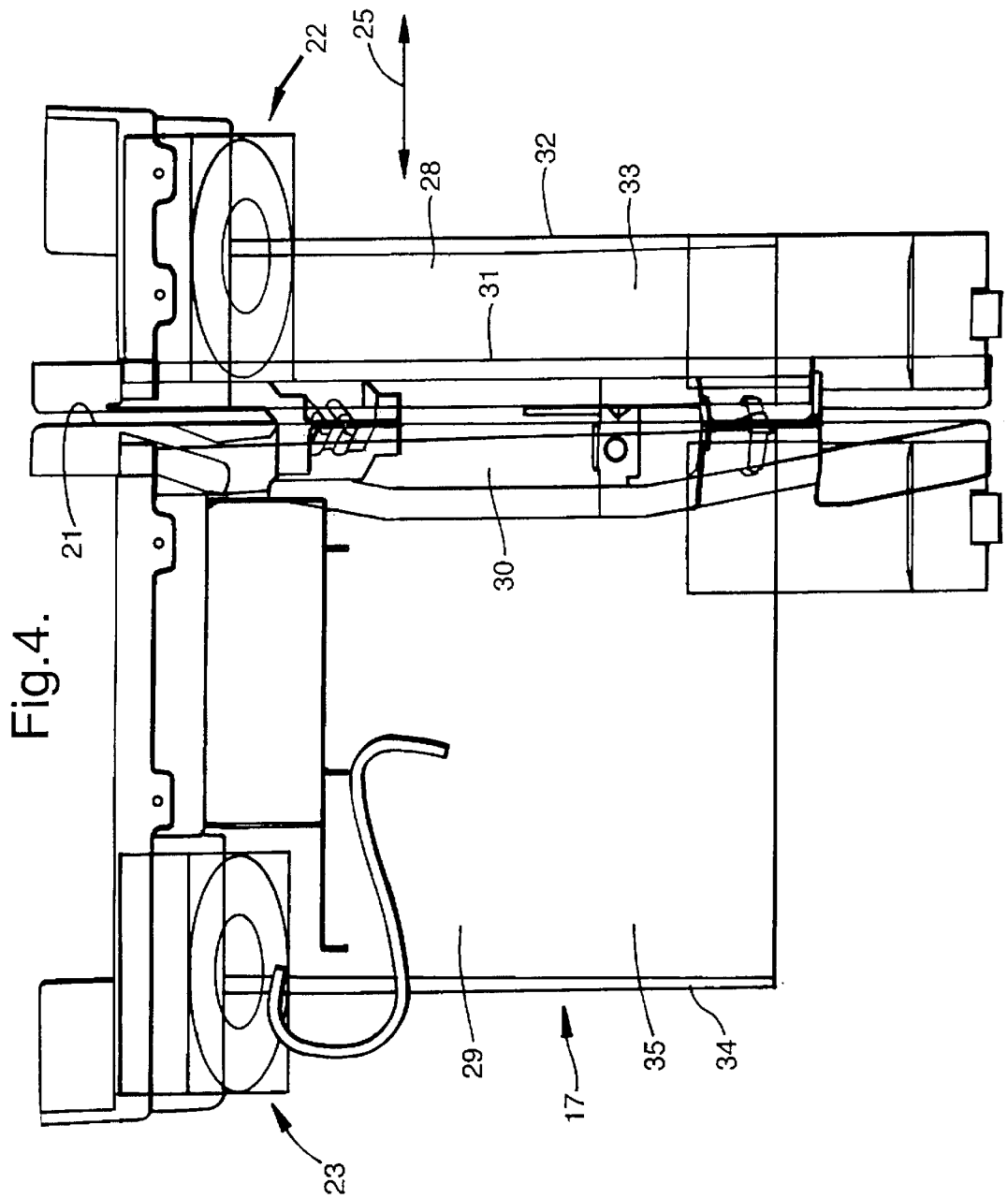

IMAGE SCANNING APPARATUS

FIELD OF THE INVENTION

The present invention relates to image scanning apparatus and in particular to such apparatus comprising a profiling surface; a feed mechanism for feeding a flexible radiation sensitive record medium across the profiling surface; and a scanning system for scanning a modulated radiation beam across the record medium to expose the record medium.

DESCRIPTION OF THE PRIOR ART

A conventional internal drum imagesetter is illustrated in the schematic end view of FIG. 5. A drum 50 has a semi-cylindrical internal profiling surface 51. A film 52 is mounted on the surface by attaching one end of the film to a loading carriage 53 which traverses round the drum. After the film has been loaded, it is exposed by a scanning radiation beam 54.

The imagesetter of FIG. 5 suffers from the problem that the film 52 will not conform precisely with the profile of the surface 51. Therefore the loading carriage will load more than the required length of film into the imagesetter.

SUMMARY OF THE INVENTION

In accordance with a first aspect of the present invention there is provided image scanning apparatus comprising a profiling surface; a feed mechanism for feeding a flexible radiation sensitive record medium across the profiling surface; a scanning system for scanning a modulated radiation beam across the record medium to expose the record medium; and a pressurizer operable simultaneously with the feed mechanism to generate a pressure difference between opposed sides of the record medium as it is fed across the profiling surface whereby the record medium engages the profiling surface and conforms with the shape of the profiling surface.

In accordance with a second aspect of the present invention there is provided a method of loading a flexible radiation sensitive record medium into an image scanning apparatus, the method comprising feeding a flexible radiation sensitive record medium across a profiling surface; generating a pressure difference between opposed sides of the record medium as it is fed across the profiling surface whereby the record medium engages the profiling surface and conforms with the shape of the profiling surface; and scanning a modulated radiation beam across the record medium to expose the record medium.

By applying a pressure difference to the record medium during the loading operation we ensure that the record medium conforms to the profiling surface during loading, and as a result the correct length of record medium is loaded into the apparatus.

The conventional imagesetter of FIG. 5 also suffers from the problem of dust particles—ie. dust particles can fall directly onto the film 52 and will either adhere to the film or fall down to the lower region 55 of the imagesetter. Dust particles can also collect on the surface 51 when a film is not present. The loading arrangement of the present invention enables the profiling surface to be oriented in alternative ways to reduce the problems causes by dust particles. For example the profiling surface can be oriented such that the normal to the profiling surface does not point directly upwards at any point. In addition it will be noted that the conventional imagesetter of FIG. 5 is oriented such that the normal to the surface 51 points upwards in the range of angles 0°–90°, and 270°–360° (with gravity g pointing directly downwards at 180°). As a result the surface 51 provides a reaction force to the gravitational force of the film 52 at all points (except at the extreme edges). In contrast, the normal to the profiling surface in the present invention can point in any direction, including downwards, ie. in the range of angles 90°–270° (in which the surface provides no reaction force and the record medium is supported by the pressure difference).

In other words, compared to the orientation of FIG. 5, the profiling surface can be oriented on its side (or even upside down) to prevent dust from falling or collecting on the profiling surface or the record medium. Similarly, a flat-bed scanner with a planar surface can be oriented with its planar profiling surface at an angle, or even upside down.

The pressurizer may generate a vacuum on one side of the record medium. However preferably the pressurizer increases the pressure on one side of the record medium.

Typically the pressurizer comprises a pressure chamber defined by a plurality of walls including the profiling surface, and means for increasing the pressure in the pressure chamber. The use of a pressure chamber ensures a relatively uniform pressure and also reduces the power requirements.

Typically the pressure chamber has one or more openings (e.g., slots) adjacent the profiling surface. This enables gas to exit from the pressure chamber in a controlled manner. By positioning the opening(s) adjacent the profiling surface we ensure that any gas flow acts to force the record medium against the profiling surface.

The profiling surface may be planar but in a preferred embodiment the profiling surface is curved, eg semi-cylindrical.

BRIEF DESCRIPTION OF THE DRAWINGS

An example of a system incorporating apparatus according to the present invention will now be described with reference to the accompanying drawings, in which:

FIG. 3 is a plan view of the baffle assembly and a film being loaded with the drum omitted;

FIG. 4 is a side view of the baffle assembly with the drum omitted; and

DETAILED DESCRIPTION OF THE EMBODIMENTS

Figure 1:
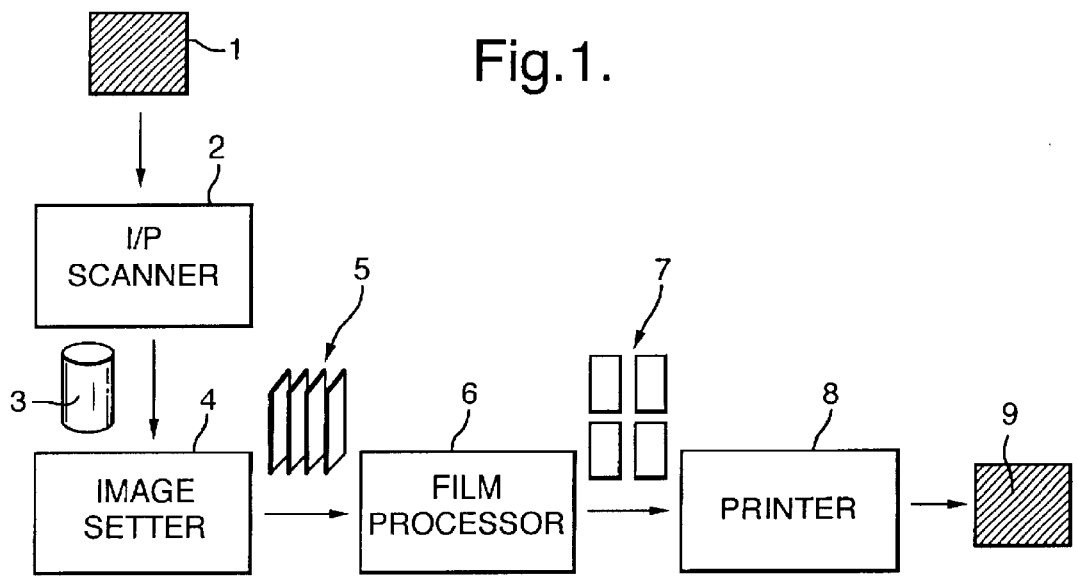
FIG. 1 shows the main components of an image processing system.
Figure 5:
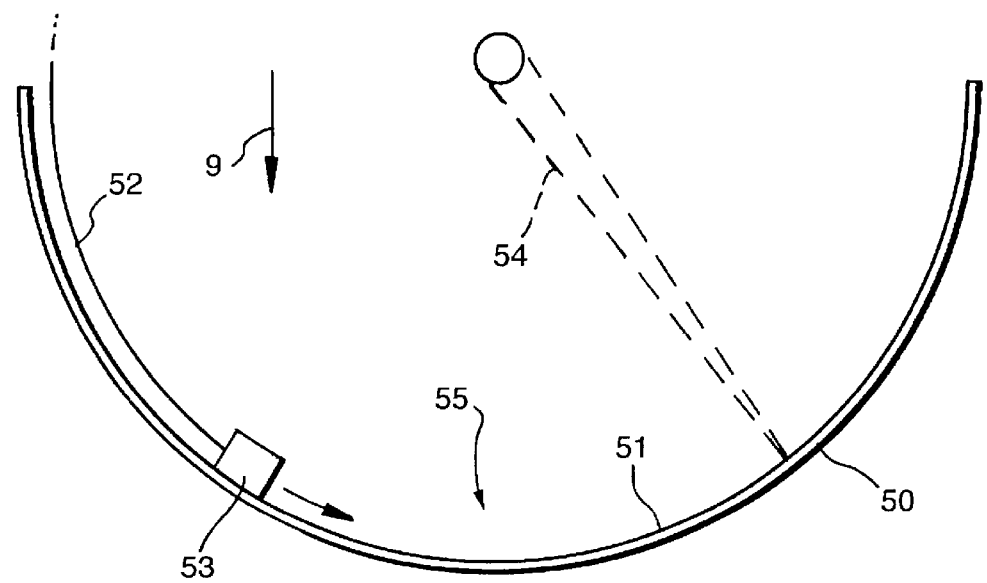
FIG. 5 is a schematic end view of a conventional internal drum imagesetter.

In the image processing system of FIG. 1, an original image 1 (such as a continuous tone color print or transparency) is scanned into an input scanner 2 which generates a set of greyscale image files 3. The image files 3 are input to an imagesetter 4. The imagesetter 4 converts the greyscale image files 3 into bit map form and prints a set of film separations 5 in accordance with the calculated bit maps.

The separations 5 are mounted on a film processor 6 which generates a set of printing plates 7. The printing plates 7 are then mounted on a printer 8 which produces a color print 9.

Figure 2:
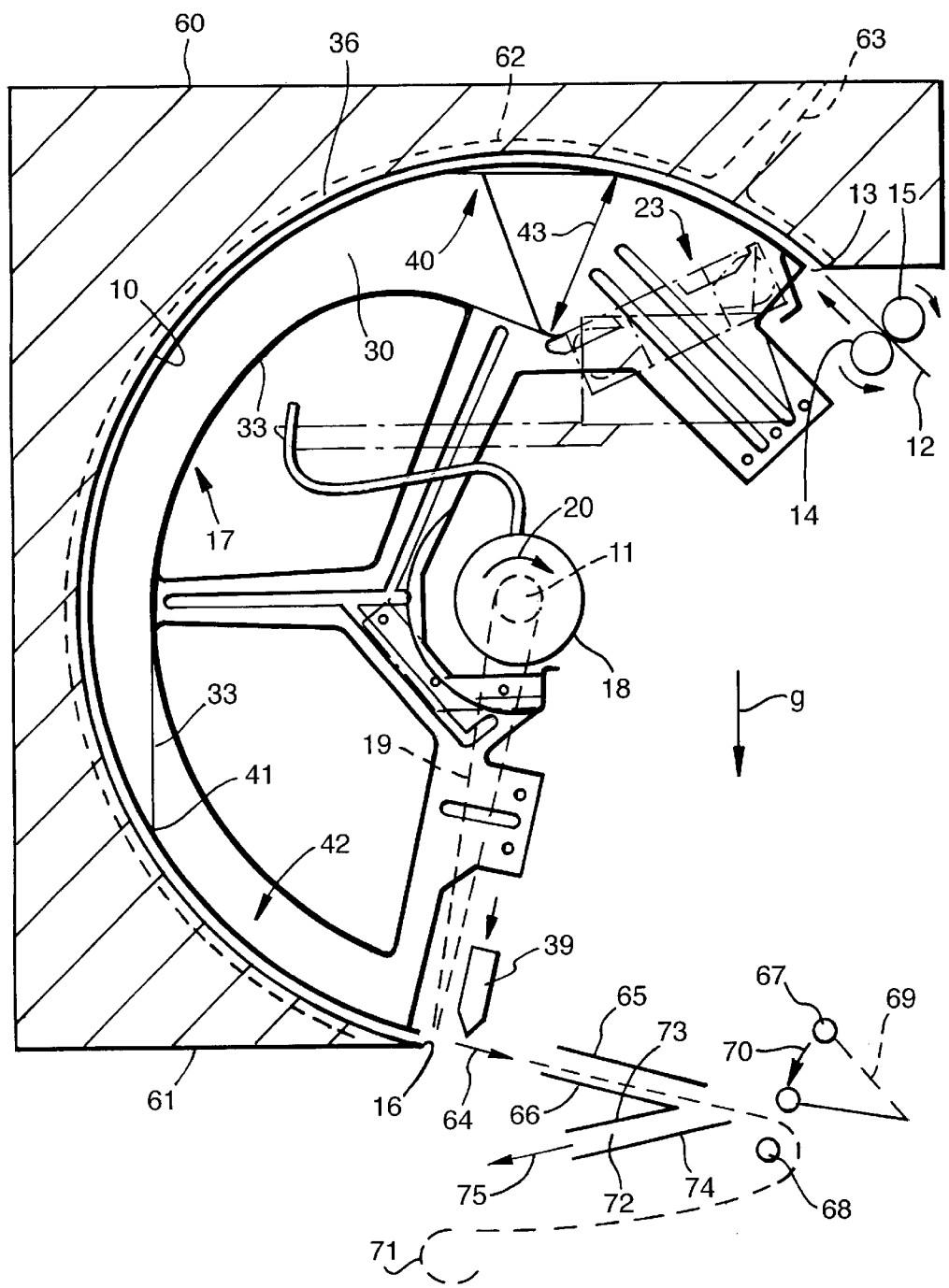
FIG. 2 is a cross-sectional view of an internal drum imagesetter.

The imagesetter 4 is illustrated in detail in FIGS. 2–4. The imagesetter 4 is an "internal drum" type imagesetter with a drum 60 with cylindrical inner profiling surface 10 and a support surface 61 for supporting the drum 60 on a table in the orientation shown.

A film sheet 12 is fed into an input slot 13 from a storage cassette (not shown) by a pair of feed rollers 14,15. The film sheet 12 is then fed across the surface 10 (as indicated at 26 in FIG. 3) until it reaches an output slot 16. A baffle assembly 17 is mounted on a carriage (not shown) which is mounted on a friction drive system (also not shown) such as a lead screw extending along the length of the drum 60. Also mounted to the carriage is a spinner 18 which directs a radiation beam 19 through a slit 21 in the baffle 17 (shown in FIGS. 3 and 4 only) to a focus point on the film 12. As the spinner 18 rotates as indicated at 20, the beam 19 traverses the film in a circumferential direction. At the same time the carriage is driven along the length of the imagesetter as indicated at 25 in FIGS. 3 and 4, causing the beam 19 to expose a helical series of scanlines on the film 12. The beam 19 is modulated with image information in a conventional manner.

The baffle assembly 17 performs two functions. Firstly the baffle has a pair of black vanes 30,31 which extend close to the film 12 and act to enclose the radiation beam in the slit 21. The vanes 30,31 absorb light reflected from the film 12 and thus prevent pre-exposure of the film 12 in regions outside the focus spot of the radiation beam 19. Secondly the baffle assists feeding of the film into the imagesetter as discussed below.

A pair of fans 22,23 are mounted to the baffle in the region of the input slot 13. Each fan comprises six angled fan blades, one of which is indicated at 27 in FIG. 3. As the fans 22,23 rotate, they each draw air from outside the imagesetter and into a respective pressure chamber 28,29. The pressure chamber 28 is defined by four walls, namely the profiling surface 10, the vane 31, a side wall 32 and a front wall 33 (with a curved profile as shown in FIG. 2). Similarly the pressure chamber 29 is defined by four walls, namely the profiling surface 10, the vane 30, a side wall 34 and a front wall 35 (which has the same profile as the front wall 33 shown in FIG. 2). A 5 mm gap 36 is provided between the vanes 30,31 and the profiling surface 10 and between the side walls 32,34 and the profiling surface 10. In addition twelve to fifteen parallel vacuum grooves are provided in the profiling surface 10 running in the feed direction of the film. The base 62 of one of the grooves is shown in dotted line in FIG. 2. The vacuum grooves are approximately 1 mm wide and rectangular in cross-section. A vacuum is applied to the grooves via a vacuum port 63 leading to a vacuum source (not shown). Therefore the pressure chambers 28,29 are each sealed apart from a pair of 5 mm slots on each side and the vacuum grooves in the surface 10. When the fans 22,23 rotate, they each draw air into their respective pressure chamber 28,29. The air exits through the 5 mm slots at a lower rate, so initially the pressure in the chambers 28,29 rises. Eventually an equilibrium situation is reached in which the pressure in the chambers 28,29 has risen to approximately 25 Pa and air exits from the 5 mm slots at the same rate as it is being drawn in by the fans 22,23.

When equilibrium has been reached, the feed rollers 14,15 are turned on to feed the film 12 into the imagesetter. The pressure difference between the two opposed sides of the film 12 forces the film against the profiling surface 10. Force is also applied to the film by the action of the air flowing through the 5 mm slots adjacent the surface 10.

When the film 12 reaches the output slot 16 the feed rollers 14,15 are stopped, a vacuum is applied to the film 12 via the vacuum grooves, and the fans 22,23 are turned off to prevent vibration during exposure. The film 12 is then exposed, and after exposure the vacuum is turned off and the feed rollers 14,15 and fans 22,23 are turned on to feed the exposed length of film out of the image setter. As the exposed 900 mm length of film is fed out as indicated at 64, it is guided by a pair of stainless steel guides 65,66 between a pair of output rollers 67,68. The upper output roller 67 is mounted on a pivoting arm 69. As the film is fed out of the imagesetter the arm 69 is held in its upper position (shown in dotted line). As the leading edge of the film reaches the roller 68, the arm 69 is pivoted down as indicated at 70 to grip the film between the rollers 67,68. The rollers 67,68 are then rotated to feed the film out of the imagesetter. The film rolls into a scroll 71. When the exposed length of film has been unloaded, a cutter 39 (FIG. 2) cuts the film 12. The feed rollers 14,15 are reversed to draw the unexposed film out of the imagesetter. The output rollers 67,68 are rotated until the rear cut edge of the film reaches an output slot 72 formed by a pair of stainless steel guides 73,74. The rollers 67,68 are then reversed to feed the exposed length of film out of the slot 72 to the film processor 6 (as indicated at 75).

Alternatively the cutter 39 may be omitted and the film may be stored as a continuous length in a film cassette, such as the cassette described in EP-A-0856769.

The surface 10 is oriented in an unconventional way as shown in FIG. 2. With the gravitational field vector g pointing directly downwards as shown in FIG. 2 it can be seen that the normal to the surface 10 (ie. a line extending away from the surface 10 to the centre of curvature 11 of the surface) does not point directly upwards at any point. As a result, dust particles falling on the film will not settle on the film. In addition the film is shielded from falling dust particles. However, because the profiling surface 10 does not provide any support to the film 12 in the upper region 40 of the imagesetter (in which the normal to the surface 10 points downwards), there is a risk of the film buckling and falling downwards away from the surface 10 in this region. The imagesetter is designed to avoid this problem in three ways.

Firstly, the fans 22,23 are mounted adjacent the upper region 40. This results in a slightly higher pressure in the upper region 40 which ensures that sufficient upwards force is applied to the film as it passes round the top part of the profiling surface 10. Secondly, the fans 22,23 are mounted adjacent the input slot 13. This results in a slightly higher pressure adjacent the input slot 13 which ensures that the film is immediately forced to conform to the curved profile of the surface 10. Thirdly, the baffle assembly 17 is shaped to provide increased force in the upper region as discussed below.

As shown in FIG. 3, the side walls 32,34 of the baffle 17 are stepped outwardly at 37,38, resulting in an greater width of 500 mm in the upper region 40 compared to the width of 360 mm at the output slot 16. The support surface 10 extends along a length of over 1130 mm so that the imagesetter can be used to expose a variety of film widths including 560 mm, 760 mm and 1130 mm. The greater area of the pressure chambers 28,29 in the upper region 40 results in a greater total force being applied to the film at this point, ensuring that the film 12 does not collapse downwards.

By mounting the fans 22,23 at the input end of the imagesetter, the general direction of the flow of air serves to assist in feeding the film into the imagesetter.

In the lower region 41 of the imagesetter the surface 10 provides a significant support force to the film. In addition the film has already been fully conformed to the a curved surface 10 and so it does not need to be forced against the surface at this point. Therefore the pressure chambers taper to an edge at 41 and no pressure is applied to the film in the lower region 41 of the imagesetter.

The front walls 33,35 are profiled as shown in FIG. 2 to provide a smooth taper in the pressure chambers 28,29, from a region of maximum breadth 43 adjacent the fans 22,23, to the edge 41. This results in a smooth flow of air and ensures a relatively constant air pressure throughout the pressure chambers 28,29.

I claim:

1. Image scanning apparatus comprising a profiling surface; a feed mechanism for feeding a flexible radiation sensitive record medium across the profiling surface; a scanning system for scanning a modulated radiation beam across the record medium to expose the record medium; and a pressurizer operable simultaneously with the feed mechanism to generate a gas pressure difference between opposed sides of the record medium as it is fed across the profiling surface whereby the record medium engages the profiling surface and conforms with the shape of the profiling surface.

2. Apparatus according to claim 1, wherein the pressurizer increases the pressure on one side of the record medium.

3. Apparatus according to claim 2, wherein the pressurizer generates a flow of gas in the feed direction of the record medium.

4. Apparatus according to claim 2, wherein the pressurizer comprises a pressure chamber defined by a plurality of walls including the profiling surface, and means for increasing the pressure in the pressure chamber.

5. Apparatus according to claim 4, wherein the means for increasing the pressure comprises one or more fans.

6. Apparatus according to claim 4, wherein the pressure chamber has one or more openings adjacent the profiling surface.

7. Apparatus according to claim 1, further comprising a support for supporting the profiling surface in an orientation in which the normal to the profiling surface does not point vertically upwards at any point.

8. Apparatus according to claim 1, further comprising a support for supporting the profiling surface in an orientation in which the normal to the profiling surface points downwards at one or more points.

9. Apparatus according to claim 1, wherein the profiling surface is curved.

10. A method of loading a flexible radiation sensitive record medium into an image scanning apparatus, the method comprising feeding the flexible radiation sensitive record medium across a profiling surface; generating a gas pressure difference between opposed sides of the record medium by increasing the gas pressure on one side of the medium as it is fed across the profiling surface whereby the record medium engages the profiling surface and conforms with the shape of the profiling surface during feeding due to the increased gas pressure; and scanning a modulated radiation beam across the record medium to expose the record medium.

11. A method according to claim 10, further comprising orienting the profiling surface whereby the normal to the profiling surface does not point vertically upwards at any point.

12. A method according to claim 10, further comprising orienting the profiling surface whereby the normal to the profiling surface points downwards at one or more points.

13. Image scanning apparatus comprising a profiling surface; a feed mechanism for feeding a flexible radiation sensitive record medium across the profiling surface; a scanning system for scanning a modulated radiation beam across the record medium to expose the record medium; and a pressurizer operable simultaneously with the feed mechanism to generate a gas pressure difference between opposed sides of the record medium by increasing the gas pressure on one side of the medium as it is fed across the profiling surface whereby the record medium engages the profiling surface and conforms with the shape of the profiling surface during feeding due to the increased gas pressure.

* * * * *